United States Patent [19]
Mikkelsen

[11] Patent Number: 6,071,110
[45] Date of Patent: Jun. 6, 2000

[54] POLISHING ROLL AND METHOD FOR MAKING SAME

[76] Inventor: Öystein Mikkelsen, 104 Bit Ct., Kissimmee, Fla. 34743-6303

[21] Appl. No.: 08/927,940

[22] Filed: Sep. 11, 1997

[51] Int. Cl.[7] ............................ B29C 47/00; B29C 59/04; F28S 5/02

[52] U.S. Cl. ...................... 425/327; 29/895.21; 29/895.3; 29/282; 264/1.6; 264/2.7; 264/284; 425/363; 425/377; 425/385; 492/46

[58] Field of Search ..................... 425/194, 325, 425/327, 363, 377, 385, 388, 810; 264/1.31, 1.33, 1.6, 2.7, 1.9, 106, 107, 284, 210.2; 29/895.21, 895.3, 282; 492/46

[56] References Cited

U.S. PATENT DOCUMENTS 629,696   7/1899   Liberty .
1,288,643  12/1918  Mayer .

(List continued on next page.)

FOREIGN PATENT DOCUMENTS

| 0 763 667 A1 | 3/1997 | European Pat. Off. . |
| 15 97 547 | 8/1970 | Germany . |
| 1146004 | 3/1969 | United Kingdom . |
| 1231063 | 5/1971 | United Kingdom . |
| 1269972 | 4/1972 | United Kingdom . |
| 1279641 | 6/1972 | United Kingdom . |
| 92/19809 | 11/1992 | WIPO . |
| 96/09154 | 3/1996 | WIPO . |

OTHER PUBLICATIONS

Patent Abstracts of Japan, vol. 006, No. 050 (M–120), Apr. 3, 1982, JP 56164826 (Dainippon Printing Co. Ltd.), Dec. 1981.

Patent Abstracts of Japan, vol. 006, No. 42, Mar. 16, 1982, JP 56159039 (Dainippon Printing Co. Ltd.), Dec. 1981.

Patent Abstracts of Japan, vol. 016, No. 282 (M–1269), Jun. 23, 1992, JP 04071897 (Dainippon Printing Co. Ltd.), Mar. 1992.

Patent Abstracts of Japan, vol. 016, No. 283 (C–0955), Jun. 24, 1992, JP 04074864 (Matsushita Electric Ind. Co. Ltd.) Jul. 1990.

Patent Abstracts of Japan, vol. 010, No. 044 (M–455), Feb. 21, 1986, JP 60196209 (Sumitomo Kinzoku Kogyo KK), Oct. 1985.

Primary Examiner—Mathieu D. Vargot
Attorney, Agent, or Firm—Allen, Dyer, Doppelt, Milbrath & Gilchrist, P.A.

[57] ABSTRACT

A polishing roll, used for forming a smooth plastic sheet, includes a chill roll and a polishing sleeve positioned on the chill roll. The polishing sleeve has a polished outer surface for forming a corresponding smooth surface in a plastic sheet. The sleeve may be readily manufactured and transported to a desired location to be installed on the chill roll. The polishing roll may be readily used in combination with an extruder for extruding a hot plastic sheet to form the smooth plastic sheet. The sleeve may also be removed from the chill roll and transported for resurfacing and without requiring transporting of the chill roll. The sleeve may preferably comprise a nickel-phosphorous composition defining at least a radially outermost portion of the sleeve in which the polished surface is formed. More particularly, the nickel-phosphorous composition is preferably an amorphous nickel-phosphorous composition comprising nickel in a range of about 75 to 86 percent, and phosphorous in a range of about 14 to 25 percent. The nickel-phosphorous composition may be formed by electrodepositing or electroless depositing.

59 Claims, 4 Drawing Sheets

U.S. PATENT DOCUMENTS

| | | |
|---|---|---|
| 1,438,231 | 12/1922 | Goodenberger et al. . |
| 1,805,009 | 5/1931 | Ruth . |
| 1,952,038 | 3/1934 | Fischer et al. . |
| 2,468,585 | 4/1949 | Bluma et al. . |
| 2,585,424 | 2/1952 | Balthrop et al. . |
| 2,724,312 | 11/1955 | Gruetzner . |
| 2,750,631 | 6/1956 | Johnson et al. . |
| 2,964,251 | 12/1960 | Samuels et al. . |
| 3,241,429 | 3/1966 | Rice et al. . |
| 3,354,519 | 11/1967 | Jansen et al. . |
| 3,380,360 | 4/1968 | Stockbridge et al. . |
| 3,385,721 | 5/1968 | Leach . |
| 3,504,059 | 3/1970 | Glenn et al. . |
| 3,594,863 | 7/1971 | Erb . |
| 3,617,281 | 11/1971 | Lindin . |
| 3,683,773 | 8/1972 | Dudley . |
| 3,756,760 | 9/1973 | McBride ............... 425/363 |
| 3,810,729 | 5/1974 | Patchell ............... 425/325 |
| 3,966,383 | 6/1976 | Bussey, Jr. et al. ............... 264/284 |
| 4,193,959 | 3/1980 | Lemelson ............... 264/166 |
| 4,244,683 | 1/1981 | Rowland ............... 425/143 |
| 4,250,135 | 2/1981 | Orsini ............... 264/284 |
| 4,461,663 | 7/1984 | Tachibana et al. . |
| 4,604,156 | 8/1986 | Raley et al. ............... 425/388 |
| 4,726,871 | 2/1988 | Hüsges et al. ............... 156/389 |
| 4,787,837 | 11/1988 | Bell ............... 425/385 |
| 4,821,936 | 4/1989 | Osborn . |
| 4,844,766 | 7/1989 | Held . |
| 4,925,379 | 5/1990 | Bourelier . |
| 5,048,745 | 9/1991 | Sato et al. ............... 264/106 |
| 5,100,312 | 3/1992 | Wiener ............... 425/186 |
| 5,133,125 | 7/1992 | Diebels et al. . |
| 5,138,918 | 8/1992 | Attardi et al. . |
| 5,324,248 | 6/1994 | Quigley . |
| 5,330,799 | 7/1994 | Sandor et al. ............... 264/1.31 |
| 5,388,803 | 2/1995 | Baumgartner et al. ............... 249/111 |
| 5,524,342 | 6/1996 | Swain et al. . |
| 5,538,677 | 7/1996 | Takahashi . |
| 5,743,981 | 4/1998 | Lu ............... 156/290 |
| 5,781,830 | 7/1998 | Gaylord et al. . |

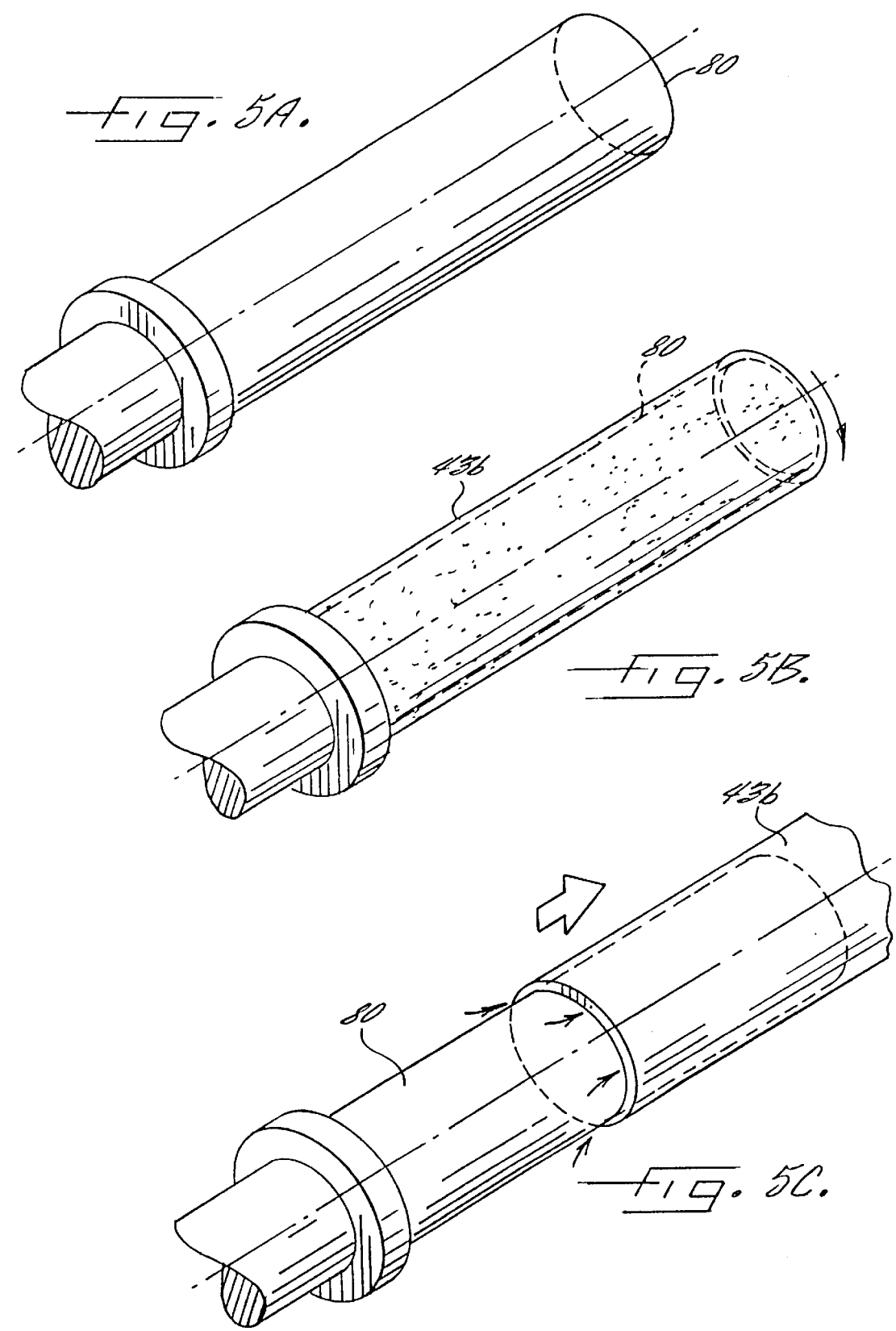

POLISHING ROLL AND METHOD FOR MAKING SAME

FIELD OF THE INVENTION

The present invention relates to machinery and methods for making plastic articles, and, more particular, to a roll for shaping and cooling a plastic sheet and a method for making the roll.

BACKGROUND OF THE INVENTION

In lenticular imaging, an optical element called a lenticular screen is placed between an image and the viewer, as disclosed, for example, in U.S. Pat. Nos. 3,504,059 to Glenn, Jr.; 2,724,312 to Gruetzner; and 3,683,773 to Dudley. Lenticular screens are typically formed from a transparent plastic sheet with lenses integrally formed on only one side that focus on the opposite and typically flat side. The lenticular elements can have many shapes, such as, for example, cylindrical, angular, spherical, or shaped like cube corners.

The original lenticular image can be created photographically, electronically or by a combination of both. Images can be reproduced and mass produced using photo-sensitive materials, printed by lithographic means or by other means of printing or transfer of inks or dyes. Electronic displays, such as cathode-tubes or flat panel displays, may also be fitted with a lenticular screen if the resolution of the display is sufficient.

One known technique for manufacturing lenticular screens includes cutting the lenticular lens pattern directly into transparent plastic materials. A lenticular screen can also be formed by the casting of thermosetting resins onto flat forms including the lenticular lens pattern. In addition, a lenticular screen may also be made by thermoforming a cast or extruded transparent sheet by heat and pressure between one polished plate and one plate with the lenticular pattern cut or engraved into its surface. Injection molding may also be used to form a lenticular screen.

A lenticular screen may also be formed by extrusion of resin onto transparent pre-produced sheet or film, wherein the lenticular pattern is embossed into the resin by an embossing roll. The applied resin may then be cured by radiation through the transparent material while the web is in contact with the embossing roller. Alternately, if the properties of the resin permit, the resin may be cured by radiation after the sheet has left the embossing roll.

A lenticular screen may also be manufactured using a machine similar to that normally used for flat sheet extrusion. As disclosed in U.S. Pat. No. 2,724,312 to Gruetzner, for example, and as shown with reference to the prior art illustration of FIG. 1, such a machine 20 includes a sheet extruder 21 and a polishing stack 22. The polishing stack 22 illustratively includes three rolls 23, 24 and 25, wherein the middle roll 24 has the lenticular pattern on its outer surface. The upper roll 23 and lower roll 25 have a smooth outer surface. A plurality of small rolls 27 support the sheet 26, and a pair of pull rolls 28 pull the sheet from the polishing stack 22. This type of machine 20 and associated method are used for most of the lenticular sheet produced at present.

The lenticular image can be reproduced on the photographic material and thereafter be laminated to the lenticular screen. There are also applications where the photographic emulsion is coated onto the flat side of the screen. The lenticular image can also be printed with inks or dyes on a suitable material which, in turn, is laminated to the back of the screen or printed directly onto the flat side of the screen. Common for all the processes are that the lenticular image and the lenticular screen meet exacting tolerances to obtain the desired result.

The three roll polishing stack 22 is basically a simplified calendar. The polishing rolls 23, 24 and 25, are also known as chill rolls in flat plastic sheet production or as embossing rolls, if a pattern is cut or engraved into their surface. The functions of the rolls are to give the sheet, which initially is pre-formed by the sheet die at the end to the extruder 21, a more uniform gage, polish the sheet surface, transfer the pattern of the embossing roll to the sheet, and chill the material to a temperature lower than its softening point to keep the sheet in the shape formed by the rolls. The embodiment of the prior art machine 20' of FIG. 2 illustrates that the rolls 23', 24' and 25' can be arranged in a diagonal orientation. Of course a horizontal orientation is also possible.

Yet another difficulty with conventional machines for making lenticular screen is that production of the polishing rolls may be elaborate and costly. A common conventional technique for fabricating a polishing roll applies a hard chrome plating for wear and corrosion resistance onto a steel mantel. The chrome layer is then polished to meet the exacting tolerances needed. Unfortunately, the entire polishing roll must be removed when worn, shipped to a remote site for refinishing, and transported back for re-installation. The roll is relatively bulky and, thus, costly to ship. In addition, the machine may be out of service while the roll is being refinished or replaced.

SUMMARY OF THE INVENTION

In view of the foregoing background, it is therefore an object of the present invention to provide a polishing roll having a construction which facilitates its manufacture and use.

This and other objects, features and advantages in accordance with the present invention are provided by a polishing roll for making a smooth surface in a plastic sheet, such as downstream from an extruder when forming a lenticular screen, and wherein the polishing roll comprises a chill roll and a polishing sleeve positioned on the chill roll. The polishing roll has a smooth outer surface for forming a corresponding smooth surface in a plastic sheet. The sleeve may be readily manufactured and transported to a desired location to be installed on the chill roll. The polishing sleeve may also be removed from the chill roll and transported for resurfacing and without requiring transporting of the chill roll. The polishing sleeve offers many other advantages including a relatively low cost compared to a chill roll having a polished exterior surface.

The polishing sleeve may preferably comprise a nickel-phosphorous composition defining at least a radially outer-most polished portion of the sleeve. More particularly, the nickel-phosphorous composition is preferably an amorphous nickel-phosphorous composition comprising nickel in a range of about 75 to 86 percent by weight, and phosphorous in a range of about 14 to 25 percent by weight. This material is durable in use, yet the smooth finish is readily formed in the composition using conventional grinding techniques. In addition, the nickel-phosphorous composition may be formed by electrodepositing or electroless depositing.

The interior surface of the polishing sleeve may have a predetermined diameter and interior surface finish to frictionally engage an adjacent exterior surface of the chill roll. When using the nickelphosphorous composition, the interior surface of the polishing sleeve will preferably have a coefficient of friction of at least about 0.1. The polishing sleeve may be secured on the chill roll by a meltable adhesive.

One method aspect of the invention is for making a polishing roll for forming a plastic sheet, such as a lenticular screen. The method preferably comprises the steps of: providing a chill roll having a generally cylindrical shape for accepting a cooling fluid therethrough; providing a polishing sleeve having a smooth outer surface for forming a corresponding smooth surface finish in a plastic sheet passed adjacent thereto; and positioning the polishing sleeve on the chill roll. The step of providing the polishing sleeve preferably comprises the steps of: forming a metal layer on a mandrel; polishing the outer surface of the metal layer while on the mandrel to form the polishing sleeve; and freeing the polishing sleeve from the mandrel. Another method aspect of the invention relates to forming the polishing sleeve.

BRIEF DESCRIPTION OF THE DRAWINGS

FIG. 5A is a perspective view of a mandrel for forming a polishing roll in accordance with a method of the present invention.

FIG. 5B is a perspective view of the mandrel with a metal layer deposited thereon in accordance with the present invention.

FIG. 5C is a perspective view of the mandrel and polishing sleeve illustrating removal of the sleeve from the mandrel in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Thicknesses of layers are exaggerated for clarity. Like numbers refer to like elements throughout.

Figure 3:
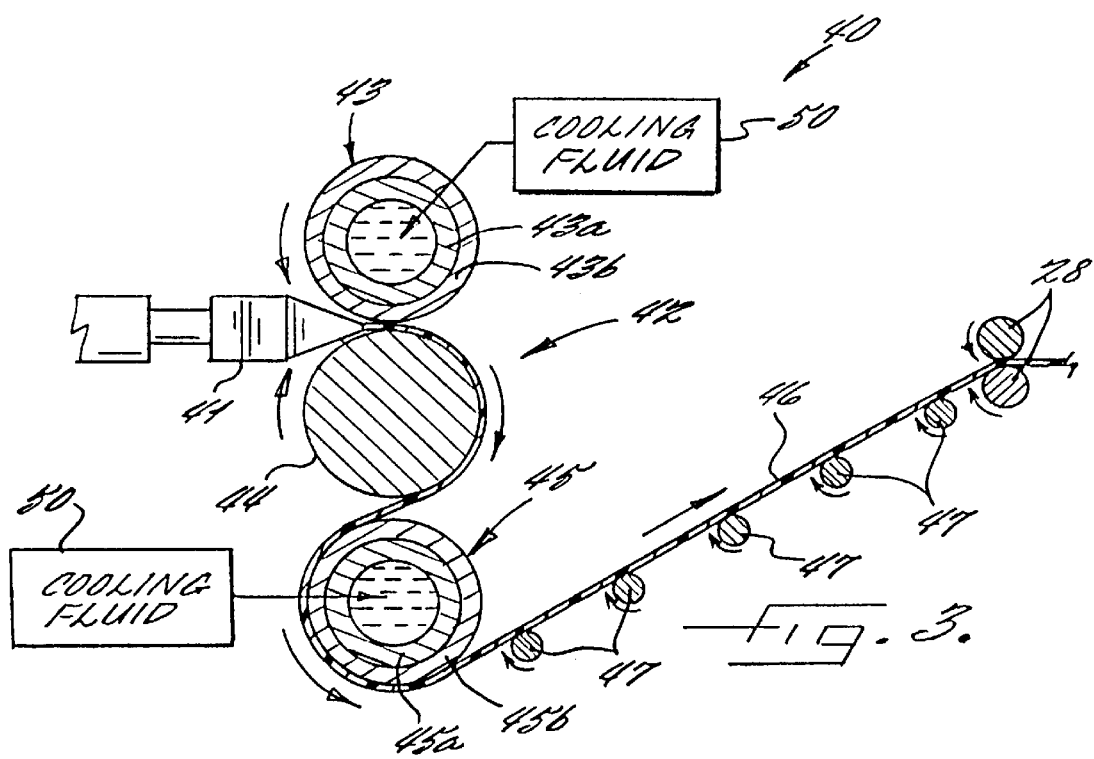
FIG. 3 is a perspective view of an embodiment of an apparatus for making a lenticular screen in accordance with the present invention.
Figure 4:
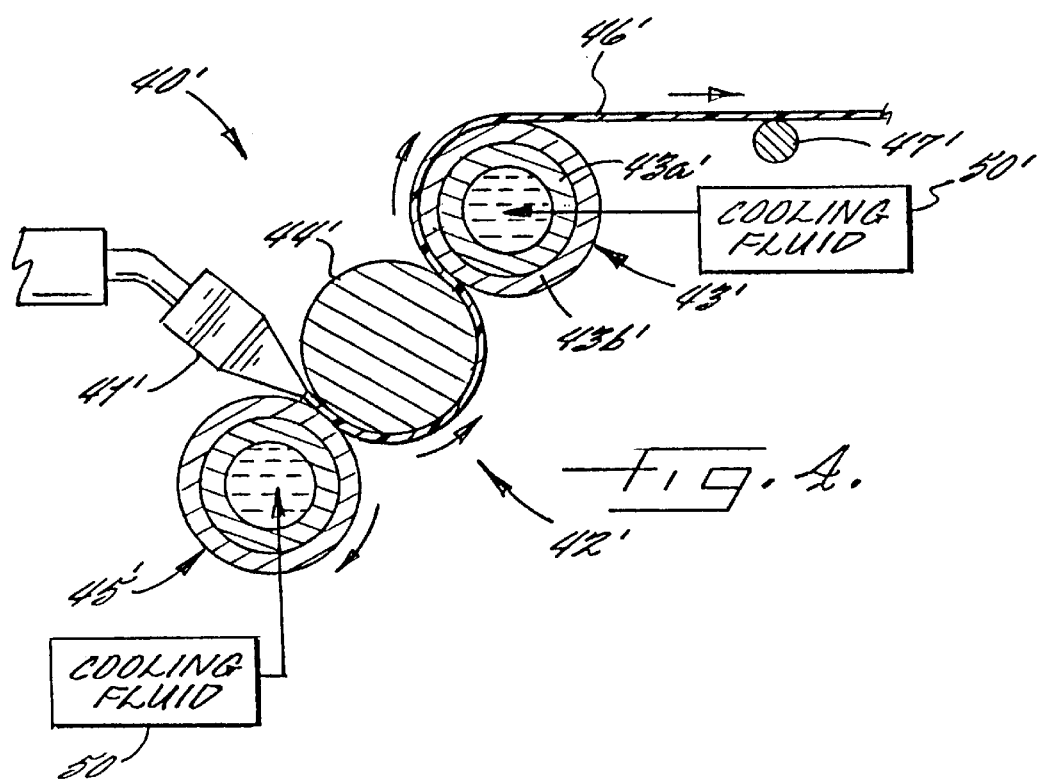
FIG. 4 is a perspective view of another embodiment of an apparatus for making a lenticular screen in accordance with the present invention.

Turning now first to FIG. 3, an apparatus 40 including the polishing roll 43 in accordance the invention is first explained. The apparatus 40 includes a sheet extruder 41 and a polishing stack 42. The polishing stack 42 illustratively includes three rolls 43, 44 and 45, wherein the middle roll 44 has the lenticular pattern on its outer surface. The upper roll 43 and lower roll 45 are both polishing rolls, that is, they have a smooth outer surface. A plurality of small rolls 47 support the sheet 46, and a pair of pull rolls 48 pull the sheet from the polishing stack 42. This type of apparatus 40 and associated method are used for most of the lenticular sheet produced at present.

The three roll polishing stack 22 is basically a simplified calendar. The polishing rolls 23 and 25 give the sheet 46, which initially is pre-formed by the sheet die at the end of the extruder 21, a more uniform gage, polish the sheet surface, assist in transferring the pattern of the embossing roll 24 to the sheet, and chill the material to a temperature lower than its softening point to keep the sheet in the shape formed by the rolls.

The upper polishing roll 43 illustratively includes a chill roll 43a and a surrounding polishing sleeve 43b. Cooling fluid is passed through the chill roll 43a from the schematically illustrated cooling fluid source 50. The lower polishing roll 45 also includes a similar construction of a chill roll 45a and a surrounding polishing sleeve 45b. The lenticular pattern forming roll 44 may also have a similar construction as described in copending patent application entitled "Lenticular Pattern Forming Roll and Method for Making the Roll" by the present applicant, having attorney work docket no. 18748, and Ser. No. 08/928,006 filed Sep. 11, 1997, the entire disclosure of which is incorporated herein by reference.

The polishing sleeve 43a on the chill roll 43b, for example, overcomes the difficulty with conventional machines for making lenticular screen wherein the production of the polishing rolls is elaborate and costly. The common conventional technique for fabricating a polishing roll applies a hard chrome plating for wear and corrosion resistance onto a steel mantel. The chrome layer is then polished to meet the exacting tolerances needed. Unfortunately, the entire polishing roll must be removed when worn, shipped to a remote site for refinishing, and transported back for re-installation. The roll is relatively bulky and, thus, costly to ship. In addition, the machine may be out of service while the roll is being refinished or replaced.

The present invention overcomes this difficulty, by making use of a polishing sleeve 43b which can be precisely formed, transported and readily installed onto the chill roll 43a. In addition, a spare sleeve 43b may be maintained in inventory in the manufacturing facility to thereby reduce downtime as would be readily understood by those skilled in the art. A higher quality finish on the plastic sheet 46 may also result from using the polishing roll 43 of the present invention.

Figure 1:
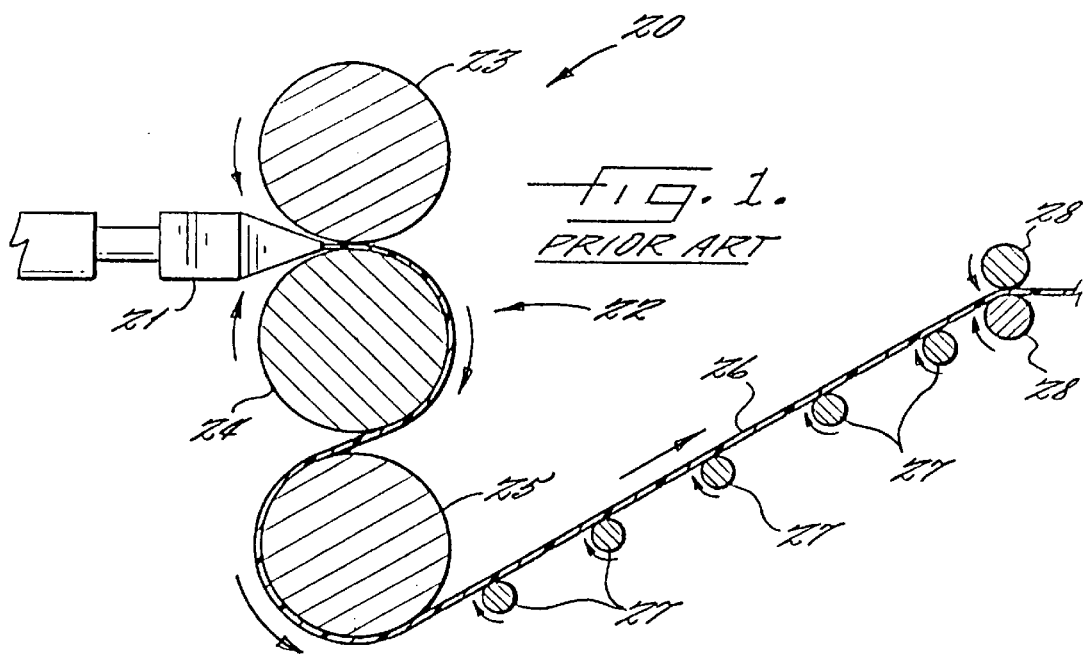
FIG. 1 is a schematic side cross-sectional view of an embodiment of an apparatus for making a lenticular screen in accordance with the prior art.
Figure 2:
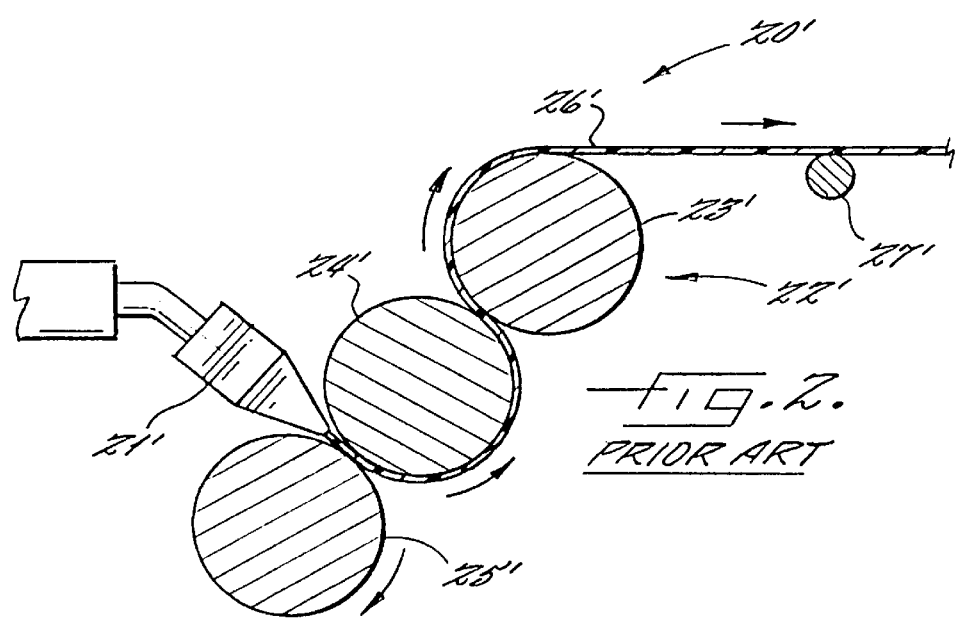
FIG. 2 is a schematic side cross-sectional view of another embodiment of an apparatus for making a lenticular screen in accordance with the prior art.

A second similar embodiment of the apparatus 40' is illustrated in FIG. 2 using prime notation to indicate similar elements to the embodiment described above with reference to FIG. 3. The similar elements require no further discussion herein. The apparatus 40' includes a polishing stack 22' in a diagonal arrangement, and those of skill in the art will recognize that the present invention is applicable to a horizontal arrangement as well without further discussion.

One method aspect of the present invention is for making a plastic sheet 46 having a smooth surface, such as for making the smooth reverse side of a lenticular screen when using a lenticular pattern forming roll 44. The method preferably comprises the steps of: extruding a hot plastic sheet 46; positioning a rotating pattern forming roll 44 downstream from the extruder 41; and using at least one polishing roll 43 for pressing the hot plastic sheet from the extruder against the pattern forming roll to form a pattern in the hot plastic sheet.

The polishing sleeve 43b may preferably comprise a nickel-phosphorous composition defining at least a radially outermost portion of the sleeve defining the smooth outer surface. More particularly, the nickel-phosphorous composition is preferably an amorphous nickel-phosphorous composition comprising nickel in a range of about 75 to 86 percent by weight, and phosphorous in a range of about 14 to 25 percent by weight. This material is durable in use, yet the smooth surface is readily formed in the composition using conventional grinding or polishing techniques. As would be readily understood by those skilled in the art, the nickel-phosphorous composition may be formed by electrodepositing or electroless depositing, for example.

The interior surface of the polishing sleeve 43b may have a predetermined diameter to frictionally engage an adjacent exterior surface of the chill roll 43a. The interior surface of the polishing sleeve 43b may also have a surface roughness to frictionally engage the adjacent exterior surface of the chill roll 43a. When using the nickel-phosphorous composition, the interior surface of the polishing sleeve 43a may preferably have a coefficient of friction of at least about 0.1.

Figure 5D:
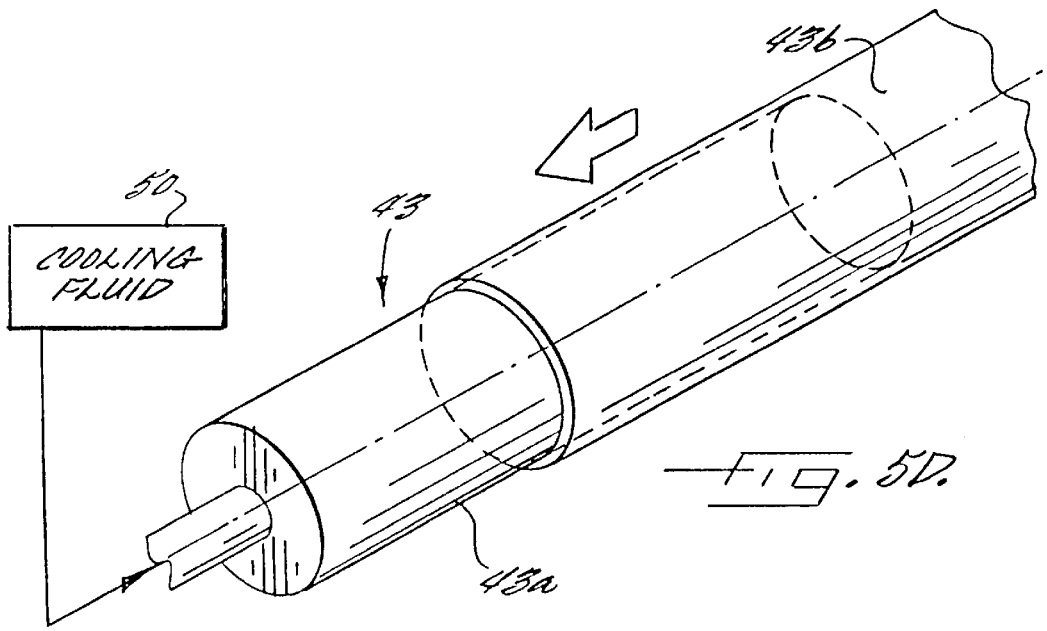
FIG. 5D is a perspective view of the polishing sleeve being installed onto a chill roll in accordance with the present invention
Figure 6:
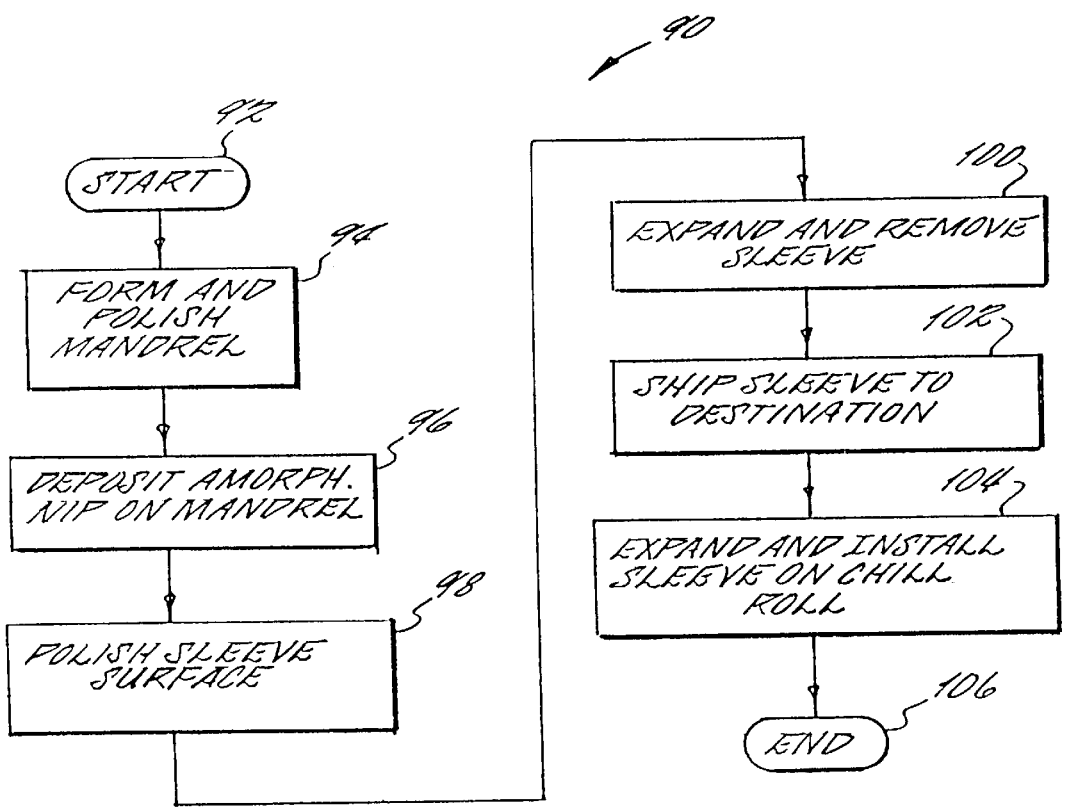
FIG. 6 is a flowchart of the method steps for making the polishing roll in accordance with the present invention.

One method aspect of the invention is for making a polishing roll 43 for forming a smooth sheet as is explained with reference to FIGS. 5A–5D and the flowchart 90 of FIG. 6. From the start at Block 92, the outer surface of a mandrel 80 is prepared, such as by polishing (Block 94) to define a desired surface (FIG. 5A). The amorphous nickel-phosphorous metal layer is deposited onto the mandrel 80 at Block 96 and polished at Block 98 to produce the polishing sleeve 43b on the mandrel 80 as shown in FIG. 5B. The metal layer may be deposited using either an electroless or electrodeposition technique as would be readily appreciated by those skilled in the art. In addition, the layer may be polished using conventional grinding and/or polishing techniques as would be readily understood by those skilled in the art.

At Block 100, the thus formed polishing sleeve 43b is removed or freed from the mandrel as shown in FIG. 5C. The sleeve 43b may be freed from the mandrel 80 by the injection of air or another fluid into the interface between the sleeve and mandrel. Alternately, a difference in coefficients of thermal expansion may be used to separate the sleeve and mandrel as would be readily appreciated by those skilled in the art. In other words, cooling or heating may be used to separate the sleeve 43b from the mandrel 80.

The polishing sleeve 43b may typically be shipped to the location making the lenticular screen or other plastic sheet as set forth in Block 102. Because of the relatively high cost of the capital equipment for forming the smooth outer surface, the polishing or refinishing is likely to only be performed at certain locations suitably equipped as would be understood by those skilled in the art. The polishing sleeve 43b may be installed onto the chill roll 43a (Block 104) as shown in FIG. 5D before the process ends (Block 106).

The step of installing the polishing sleeve 43b onto the chill roll 43a may also be aided by the injection of air or other fluid into the interface between the sleeve and chill roll. Alternately, heating may be used to first expand the sleeve prior to positioning on the chill roll. The chill roll may also be reduced in size or contracted by cooling. In other words, the freeing may be based upon a difference in coefficients of thermal expansion between the sleeve 43b and the chill roll 43a. Of course, the sleeve 43b may also be removed from the chill roll to facilitate changing to a new sleeve, such as to permit refinishing of the sleeve 43b as would be appreciated by those skilled in the art.

The polishing sleeve 43b can also be secured to the chill roll 43a using a hot-melt adhesive, for example, and with a suitable melting point so that the sleeve will not separate when being used as will be readily appreciated by those skilled in the art. Another form of an adhesive bond make be provided by a low melting temperature solder metal or alloy applied to one or both of the outer surface of the chill roll 43a and the inner surface of the sleeve 43b. By heating the sleeve and roll assembly to the appropriate temperature and keeping the sleeve 43b in the proper position while cooling the assembly below the melting point of the adhesive or solder, the sleeve can be fixed to the chill roll 43a with very high strength. In both examples, of course, the sleeve 43b can be removed by re-heating the assembly to the appropriate melting temperature as would be readily understood by those skilled in the art.

Nickel alloys may be especially suitable for polishing. The inventor of the present invention previously developed chemistry and methods for making relatively thick deposits (50 to 500 micron) of amorphous nickel-phosphorous with 13 to 15% phosphorous content by weight) by electroless depositing. At present, amorphous nickel-phosphorous compositions with even higher phosphorous content can also be deposited by electrodepositing as would be readily understood by those skilled in the art. Although the mechanism is not entirely understood, tool wear is minimized when the phosphorus content of the deposit is greater than about 11% (by weight). Accordingly, the nickel-phosphorous has good lubricating properties which makes it well suited for tools used in the forming of plastics.

Both the electroless and electrodeposited nickel-phosphorous alloys can be used for the polishing sleeve 43b, but the electrodeposited may have some advantages. Electrodeposition may be at a rate of up to 60 microns per hour and a phosphorous content of higher than about 15% can be obtained. Another advantage of the electrodeposited nickel-phosphorous composition is the consistently higher density as compared to the electroless deposited material. It is believed without applicant being bound thereto that the electrodeposited nickel-phosphorous alloys contain a lower void volume than the electroless deposited alloys, that is, the nickel and phosphorous are more closely packed. This reduces the porosity in the plated deposit thereby resulting in improved surface finish. In addition, electrodeposited Ni—P can have a hardness of Rockwell C 45–51 as deposited, and by heat treatment can reach a hardness of Rockwell C 70–72. This hardness range is sufficient to obtain a polishing sleeve 43b with a relatively long service life.

There are several configurations or variations of the polishing roll 43 including the polishing sleeve 43b. For example, a cylindrical sleeve portion may be produced by depositing 100% nickel onto the mandrel 80, depositing required thickness of nickel-phosphorous alloy and polishing the outer layer. Of course, the entire sleeve 43b may be formed either by the electroless depositing or electrodepositing of the nickel-phosphorous onto the mandrel 80, and thereafter the sleeve is polished.

In other embodiments, a base portion of the sleeve 43b may be produced by electrodepositing the nickel-phosphorous onto the mandrel 80, another metal or metal alloy suited for polishing is deposited onto the base portion, and the polishing is performed on the other metal or alloy.

Similarly, the base portion of the sleeve 43b may be produced by electrodepositing nickel onto the mandrel 80, another metal or metal alloy suited for polishing is deposited onto the base portion, and the outer surface is polished.

In yet another embodiment, a cylindrical sleeve for fitting by expansion onto a suitable roll is produced by hot or cold rolling from a ring produced by casting and/or machining of a metal or alloy suited for polishing. Alternately, the metal or alloy suited for polishing is deposited onto the underlying cylindrical sleeve, thereafter the outer surface is polished.

As long as the outer or mantel surface of the chill roll 43a, to be used with the polishing sleeve 43b is not damaged in any way, the roll itself need not be resurfaced when the sleeve is exchanged. The polishing of the sleeve may also take place on extremely accurate machines in accordance with the invention. The polishing sleeve 43b enables less weight to be manipulated during polishing as would be readily appreciated by those skilled in the art. Less weight to be handled during polishing results in one or both of easier polishing and higher accuracy.

The following table, formulas, derivations and calculations show that it is possible for the nickel-phosphorous polishing sleeve 43b to be fitted onto a chill roll 43a to produce a polishing roll 43 that can fill the requirements for use in production of plastic sheet and film:

The properties of the electrodeposited Ni—P are as follows:

| Properties: | Typical Value: |
|---|---|
| Composition | 75–86% N:, 14–25% P |
| Coefficient of Friction | 0.13 |
| Corrosion Resistance | 1000+ hours @ .001" |
| Neutral Salt Spray (ASTM B-117) | 500 hours @ .0003" |
| Copper Accelerated Salt Spray | 200+ hours @ .0003" |
| CASS (ASTM B-368) | |
| RCA Nitric Acid Test | Unlimited exposure without attack |
| Thickness Constraints | None |
| Hardness | |
| As Deposited | Rockwell C 45–51 |
| Bake 590° F./3 hours | Rockwell C 63–66 |
| Bake 750° F./1 hour | Rockwell C 70–72 |
| Melting Point | 1630° F. |
| Density | 7.6 g/cm$^3$ (0.27 pounds/inch$^3$) |
| Internal Stress | None |
| Tensile strength | |
| As Deposited | ~100 KSI |
| Heat Treated | ~270 KSI |
| Ductility | |
| per ASTM Bend Test | 10%–15% elongation typ. |
| Wear Resistance | Comparable to Hard Chrome |

At 20° C., the roll diameter is D, and at temperature t, the roll diameter can be found from Dt=D(1+ΔT Coer), and ΔT=t−20, where Coer is expansion coefficient of steel. A pull of 5,000 N (maximum) is needed for most of the known plastic materials when produced in a polishing stack or calendar. At temperature t, the sleeve 43b should apply a pressure of Pt to clamp sufficiently around the chill roll 43a for adequate friction between the sleeve and the chill roll. Pt is given below and where L is length of the sleeve, and f is coefficient of friction between the sleeve and the chill roll:

$$Pt = \frac{5{,}000/f}{\pi Dt \cdot L} \approx \frac{5{,}000}{\pi D L f} \quad (1)$$

$$= Dt \cdot L \cdot Pt$$

$$N\max = \int_{-}^{\pi} PtL \cdot \frac{Dt}{2} \cdot \sin\alpha \cdot d\alpha \quad (2)$$

$$N\max = DtL \cdot \frac{Pt}{2} = \frac{5{,}000}{2\pi f \cdot L \cdot tm}$$

At temperature t, the maximum stress in the sleeve will be (Pt is also imparting stress to the sleeve, but that is small enough to be neglected) and tm is the thickness of Ni—P sleeve:

$$\sigma\max(t) = \frac{N\max}{L \cdot tm} = \frac{5{,}000}{2\pi f \cdot L \cdot tm}$$

Supposing now that the inside diameter of the sleeve at temperature t is dt, (when it is free), then the mean diameter will be dt+tm. Under a stress of σmax the sleeve will expand to an inside diameter of Dt, and a mean diameter of Dt+tm. The expanded length is, where E is Young's modulus of the sleeve:

$$\Delta Lt = \pi(Dt+tm) - \pi(dt+tm) = \pi(Dt-dt)$$

but:

$$dt = d(1 + \Delta T\ Coes)$$

$$D = D(1 + \Delta T\ Coer)$$

$$\Delta Lt = \pi[(D - d + \Delta T(D \cdot Coer - d \cdot Coes)]$$

$$Lt = \pi(dt + tm)$$

$$= \pi[d(1 + \Delta T Coes) + tm]$$

$$\frac{\Delta Lt}{Lt} = \frac{\sigma\max}{E}$$

$$\frac{D - d + \Delta T(D \cdot Coer - dCoes)}{d(1 + \Delta T\ Coes) + tm} = \frac{5{,}000}{2\pi f \cdot L \cdot tmE}$$

From the above equations, we can find the value of d. The pressure needed to expand the sleeve from an inside diameter of D+δ at 20° C.:

$$\Delta L = \pi(D+\delta-d)$$

$$L = \pi(d+tm)$$

δ is the gap needed for safely fitting the sleeve onto the chill roll.

$$\Delta L/L = \sigma/E$$

$$\sigma = \Delta L\ E/L = \frac{(D + \delta - d)}{d + tm} E$$

$$\sigma = \frac{N}{A} = \frac{1/2(D+\delta) \cdot L \cdot P}{d + tm} = \frac{(D+\delta)P}{2\ tm}$$

$$\frac{(D+\delta)P}{2\ tm} = \frac{(D+\delta-d)E}{d + tm}$$

-continued $$P = \frac{2\ tm(D + \delta - d)}{(D + \delta)(d + tm)} \cdot E$$

and wherein P is the air pressure needed to expand the sleeve.

Accordingly, the following table is based upon using the above equations and the following parameters: D=900 mm, E=2×10$^5$ Mpa, T=25 degrees Celsius (That is t=45 degrees Celsius, for ample applications), L=800 mm, f=0.1, and δ=0.1.

| tm (mm) | d (mm) | P (N/mm$_2$) | (N/mm$_2$) |
|---|---|---|---|
| 0.15 | 899.657 | 0.0328 | 98.4 |
| 0.20 | 899.731 | 0.0364 | 81.9 |
| 0.25 | 899.776 | 0.040 | 72.0 |
| 0.30 | 899.806 | 0.044 | 66.0 |
| 0.35 | 899.827 | 0.047 | 60.4 |
| 0.40 | 899.843 | 0.051 | 57.4 |
| 0.45 | 899.856 | 0.054 | 54.0 |
| 0.50 | 899.865 | 0.058 | 52.2 |

The stress inside the nickel-phosphorous sleeve σ is always much less than the tensile strength, that is, σb=100 KSI~270 KSI, ie, σb=689.5 N/mm$^2$~1861.6 N/mm$^2$.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A polishing roll for use in forming a smooth surface in a plastic sheet downstream from an extruder, said polishing roll comprising:
   a chill roll having a generally cylindrical shape and for accepting a cooling fluid therethrough; and
   a polishing sleeve positioned on said chill roll, said polishing sleeve comprising a nickel-phosphorous composition and having a polished outer surface thereof for forming a corresponding smooth surface in a plastic sheet passed adjacent thereto.

2. A polishing roll according to claim 1 wherein said nickel-phosphorous composition defines at least a radially outermost smooth portion.

3. A polishing roll according to claim 1 wherein said nickel-phosphorous composition is an amorphous nickel-phosphorous composition.

4. A polishing roll according to claim 1 wherein said nickel-phosphorous composition comprises at least about 75 percent nickel by weight.

5. A polishing roll according to claim 1 wherein said nickel-phosphorous composition comprises less than about 86 percent nickel by weight.

6. A polishing roll according to claim 1 wherein said nickel-phosphorous composition comprises at least about 14 percent phosphorous by weight.

7. A polishing roll according to claim 1 wherein said nickel-phosphorous composition comprises less than about 25 percent phosphorous by weight.

8. A polishing roll according to claim 1 wherein said nickel-phosphorous composition is an electrodeposited nickel-phosphorous composition.

9. A polishing roll according to claim 1 wherein said nickel-phosphorous composition is an electroless deposited nickel-phosphorous composition.

10. A polishing roll according to claim 1 wherein said nickel-phosphorous composition has a Rockwell C hardness of at least about 45.

11. A polishing roll according to claim 1 wherein an interior surface of said polishing sleeve has a predetermined diameter relative to an outer diameter of an adjacent exterior surface of said chill roll to frictionally engage same.

12. A polishing roll according to claim 1 wherein an interior surface of said polishing sleeve has a predetermined surface roughness to frictionally engage an adjacent exterior surface of said chill roll.

13. A polishing roll according to claim 12 wherein said predetermined surface roughness of said polishing sleeve has a coefficient of friction of at least about 0.1.

14. A polishing roll according to claim 1 further comprising an adhesive layer between an interior surface of said polishing sleeve and an adjacent surface of said chill roll.

15. A polishing roll according to claim 14 wherein said adhesive layer comprises at least one of a meltable adhesive and a meltable solder.

16. A polishing roll for forming a smooth surface in a plastic sheet downstream from an extruder, said polishing roll comprising:
   a chill roll having a generally cylindrical shape and for accepting a cooling fluid therethrough; and
   a polishing sleeve positioned on said chill roll in frictional engagement therewith, said polishing sleeve having a smooth outer surface for forming a corresponding smooth surface in a plastic sheet passed adjacent thereto, said polishing sleeve comprising a nickel-phosphorous composition defining at least a radially outermost portion thereof.

17. A polishing roll according to claim 16 wherein said nickel-phosphorous composition is an amorphous nickel-phosphorous composition.

18. A polishing roll according to claim 16 wherein said nickel-phosphorous composition comprises nickel in a range of about 75 to 86 percent by weight, and phosphorous in a range of about 14 to 25 percent by weight.

19. A polishing roll according to claim 16 wherein said nickel-phosphorous composition is an electrodeposited nickel-phosphorous composition.

20. A polishing roll according to claim 16 wherein said nickel-phosphorous composition is an electroless deposited nickel-phosphorous composition.

21. A polishing roll according to claim 16 wherein said nickel-phosphorous composition has a Rockwell C hardness of at least about 45.

22. A polishing roll according to claim 16 wherein an interior surface of said polishing sleeve has a predetermined diameter relative to an outer diameter of an adjacent exterior surface of said chill roll to frictionally engage same.

23. A polishing roll according to claim 16 wherein an interior surface of said polishing sleeve has a predetermined surface roughness to frictionally engage an adjacent exterior surface of said chill roll.

24. A polishing roll according to claim 23 wherein said predetermined surface roughness of said polishing sleeve has a coefficient of friction of at least about 0.1.

25. A polishing roll according to claim 16 further comprising an adhesive layer between an interior surface of said polishing sleeve and an adjacent surface of said chill roll.

26. A polishing roll according to claim 25 wherein said adhesive layer comprises at least one of a meltable adhesive and a meltable solder.

27. A polishing sleeve for positioning over a chill roll having a generally cylindrical shape for accepting a cooling fluid therethrough, said polishing sleeve comprising:

a tubular body comprising a nickel-phosphorous composition and having a smooth outer surface for forming a corresponding smooth surface in a plastic sheet passed adjacent thereto.

28. A polishing sleeve according to claim 27 wherein said nickel-phosphorous composition defines at least a radially outermost portion thereof.

29. A polishing sleeve according to claim 27 wherein said nickel-phosphorous composition is an amorphous nickel-phosphorous composition comprising nickel in a range of about 75 to 86 percent by weight, and phosphorous in a range of about 14 to 25 percent by weight.

30. A polishing sleeve according to claim 27 wherein said nickel-phosphorous composition has a Rockwell C hardness of at least about 45.

31. An apparatus for making a lenticular screen, said apparatus comprising:

an extruder for extruding a hot plastic sheet; and
a polishing roll downstream from said extruder, said polishing roll comprising
a chill roll having a generally cylindrical shape and for accepting a cooling fluid therethrough, and
a polishing sleeve positioned on said chill roll, said polishing sleeve comprising a nickel-phosphorous composition and having a smooth outer surface for forming a corresponding smooth surface in the plastic sheet passed adjacent thereto.

32. An apparatus according to claim 31 wherein said polishing sleeve is frictionally engaged on said chill roll.

33. An apparatus according to claim 31 wherein said polishing sleeve is adhesively secured on said chill roll.

34. An apparatus according to claim 31 wherein said nickel-phosphorous composition is an amorphous nickel-phosphorous composition comprising nickel in a range of about 75 to 86 percent by weight, and phosphorous in a range of about 14 to 25 percent by weight.

35. An apparatus according to claim 31 wherein said nickel-phosphorous composition has a Rockwell C hardness of at least about 45.

36. A method for making a polishing roll for forming a smooth surface in a plastic sheet downstream from an extruder, the method comprising the steps of:

providing a chill roll having a generally cylindrical shape for accepting a cooling fluid therethrough;

providing a polishing sleeve comprising a nickel-phosphorous composition and having a smooth outer surface for forming a corresponding smooth surface in a plastic sheet passed adjacent thereto; and positioning the polishing sleeve on the chill roll to define the polishing roll.

37. A method according to claim 36 wherein the step of providing the polishing sleeve comprises the steps of:

forming a metal layer on a mandrel;
polishing an outer surface of the metal layer while on the mandrel to form the polishing sleeve; and
freeing the polishing sleeve from the mandrel.

38. A method according to claim 37 wherein the steps of forming, polishing, and freeing are performed remote from the chill roll; and further comprising the step of transporting the polishing sleeve from the mandrel to the chill roll.

39. A method according to claim 37 wherein the step of freeing the polishing sleeve from the mandrel comprises expanding the polishing sleeve by injecting fluid between the mandrel and the polishing sleeve.

40. A method according to claim 37 wherein the polishing sleeve and the mandrel have different coefficients of thermal expansion; and wherein the step of freeing the polishing sleeve from the mandrel comprises freeing same based upon the different coefficients of thermal expansion.

41. A method according to claim 37 wherein the step of forming the metal layer comprises forming the nickel-phosphorous composition.

42. A method according to claim 41 wherein the step of forming the nickel-phosphorous composition comprises forming an amorphous nickel-phosphorous composition comprising nickel in a range of about 75 to 86 percent by weight, and phosphorous in a range of about 14 to 25 percent by weight.

43. A method according to claim 41 wherein the step of forming the nickel-phosphorous composition comprises electrodepositing the nickel-phosphorous composition.

44. A method according to claim 41 wherein the step of forming the nickel-phosphorous composition comprises electrolessly depositing the nickel-phosphorous composition.

45. A method according to claim 41 further comprising the step of hardening the nickel-phosphorous composition to have a Rockwell C hardness of at least about 45.

46. A method according to claim 36 wherein the step of positioning the polishing sleeve on the chill roll comprises frictionally engaging the polishing sleeve onto the chill roll.

47. A method according to claim 36 further comprising the step of forming an interior surface of the polishing sleeve to have a predetermined surface roughness to frictionally engage an adjacent exterior surface of the chill roll.

48. A method according to claim 36 wherein the step of positioning the polishing sleeve on the chill roll comprises expanding the polishing sleeve by injecting a fluid between the chill roll and the polishing sleeve.

49. A method according to claim 36 wherein the polishing sleeve and the chill roll have different coefficients of thermal expansion; and wherein the step of positioning the polishing sleeve on the chill roll comprises positioning same based upon the different coefficients of thermal expansion.

50. A method according to claim 36 wherein the step of positioning the polishing,sleeve on the chill roll comprises securing the polishing sleeve to the chill roll using a meltable adhesive.

51. A method for making polishing sleeve to be used in an apparatus for forming a smooth surface in a plastic sheet downstream from an extruder, the apparatus including a chill roll having a generally cylindrical shape and for accepting a cooling fluid therethrough, the method comprising the steps of:

forming a metal layer comprising a nickel-phosphorous composition on a mandrel;

polishing an outer surface of the metal layer while on the mandrel to form the polishing sleeve; and freeing the polishing sleeve from the mandrel.

52. A method according to claim 51 wherein the steps of forming, polishing, and freeing are performed remote from the chill roll.

53. A method according to claim 51 wherein the step of freeing the polishing sleeve from the mandrel comprises expanding the polishing sleeve by injecting fluid between the mandrel and the polishing sleeve.

54. A method according to claim 51 wherein the polishing sleeve and the mandrel have different coefficients of thermal expansion; and wherein the step of freeing the polishing sleeve from the mandrel comprises freeing same based upon the different coefficients of thermal expansion.

55. A method according to claim 51 wherein the step of forming the metal layer comprises forming the nickel-phosphorous composition.

56. A method according to claim 55 wherein the step of forming the nickel-phosphorous composition comprises forming an amorphous nickel-phosphorous composition comprising nickel in a range of about 75 to 86 percent by weight, and phosphorous in a range of about 14 to 25 percent by weight.

57. A method according to claim 55 wherein the step of forming the nickel-phosphorous composition comprises electrodepositing the nickel-phosphorous composition.

58. A method according to claim 55 wherein the step of forming the nickel-phosphorous composition comprises electrolessly depositing the nickel-phosphorous composition.

59. A method according to claim 55 further comprising the step of hardening the nickel-phosphorous composition to have a Rockwell C hardness of at least about 45.

* * * * *